(12) United States Patent
Albino

(10) Patent No.: US 6,532,993 B2
(45) Date of Patent: *Mar. 18, 2003

(54) UNDERGROUND PIPING SYSTEM

(75) Inventor: Mark Albino, Belchertown, MA (US)

(73) Assignee: Omega Flex, Inc., Westfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/910,173

(22) Filed: Jul. 20, 2001

(65) Prior Publication Data

US 2001/0039971 A1 Nov. 15, 2001

Related U.S. Application Data

(63) Continuation of application No. 09/488,136, filed on Jan. 20, 2000, now Pat. No. 6,315,003
(60) Provisional application No. 60/116,770, filed on Jan. 22, 1999.

(51) Int. Cl.[7] .................................................. F16L 11/00
(52) U.S. Cl. ....................... 138/120; 138/155; 138/110; 285/381.1

(58) Field of Search .................... 138/120, 155, 138/109; 285/909, 381.1, 55

(56) References Cited

U.S. PATENT DOCUMENTS

| | | | | | |
|---|---|---|---|---|---|
| 3,627,354 | A | * | 12/1971 | Toepper | ........................ 285/55 |
| 4,169,477 | A | * | 10/1979 | Bokros | ........................ 604/175 |
| 4,514,241 | A | * | 4/1985 | Maukola | ....................... 156/79 |
| 4,709,948 | A | * | 12/1987 | Archer et al. | ............ 285/381.1 |
| 6,009,610 | A | * | 1/2000 | Brandolf | .................. 29/402.03 |
| 6,315,003 | B1 | * | 11/2001 | Albino | ........................ 138/120 |

* cited by examiner

Primary Examiner—Patrick Brinson
(74) Attorney, Agent, or Firm—Cantor Colburn LLP

(57) ABSTRACT

An exemplary embodiment of the invention is a kit for installing an underground piping system. The kit includes a protective conduit having flexible piping contained therein and a plurality of sealing members. The installer positions the protective conduit and flexible piping as a single unit thereby facilitating installation.

14 Claims, 2 Drawing Sheets

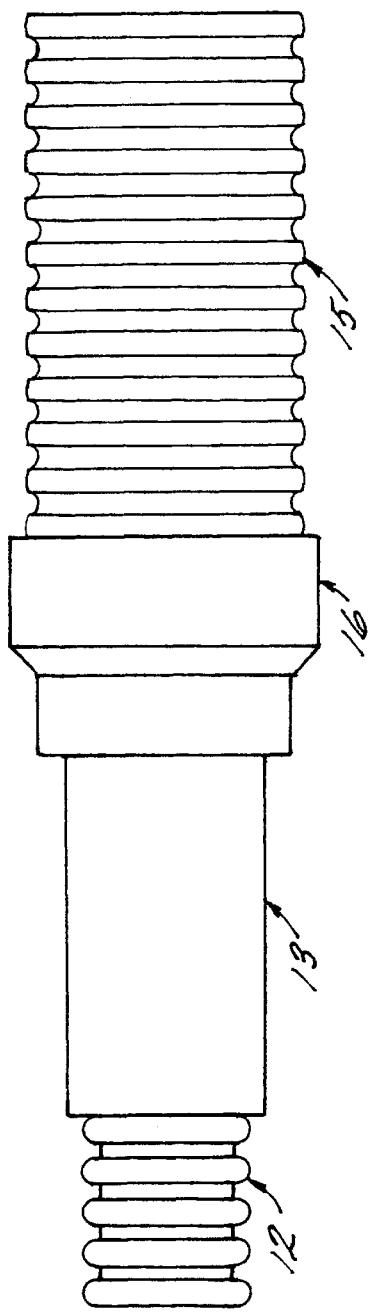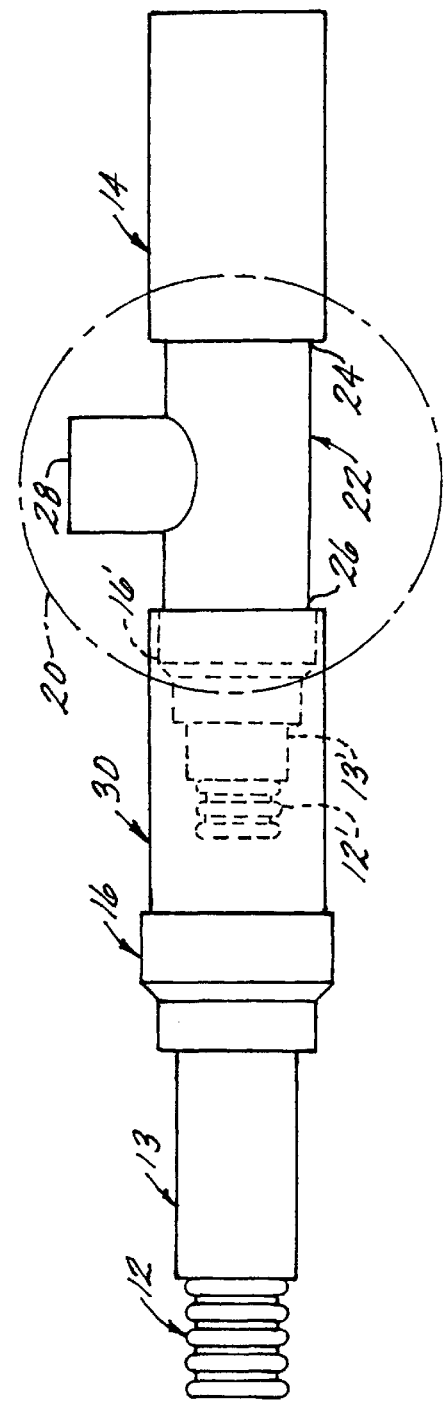

UNDERGROUND PIPING SYSTEM

CROSS REFERENCE TO RELATED APPLICATIONS

This application is a continuation of U.S. patent application Ser. No. 09/488,136 filed Jan. 20, 2000, now U.S. Pat. No. 6,315,003 the entire contents of which are incorporated herein by reference, and claims the benefit of U.S. provisional application Ser. No. 60/116,770 filed Jan. 22, 1999, the entire contents of which are incorporated herein by reference.

BACKGROUND OF THE INVENTION

The invention relates generally to piping systems and in particular to an underground piping system using flexible gas piping. Currently, flexible gas piping, such as corrugated stainless steel tubing (CSST), is used in underground applications or received in concrete slabs. Various plumbing and mechanical codes require that such installations of CSST be protected. Typically, protective conduit is placed in underground installations and the flexible piping is positioned in the protective conduit by pulling the flexible piping through the protective conduit. Pulling the flexible piping through the protective conduit creates excess labor and increases the cost of installing flexible piping.

SUMMARY OF THE INVENTION

The above-discussed and other drawbacks and deficiencies of the prior art are overcome or alleviated by the underground piping system of the present invention. An exemplary embodiment of the invention is a kit for installing an underground piping system. The kit includes a protective conduit having flexible piping contained therein and a plurality of sealing members. The installer positions the protective conduit and flexible piping as a single unit thereby facilitating installation.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 5 is a side view of an alternate embodiment of the invention; and,

FIG. 6 is a cross sectional view of an alternate embodiment of the invention.

DETAILED DESCRIPTION OF THE PREFERRED EMBODIMENTS

Figure 1:
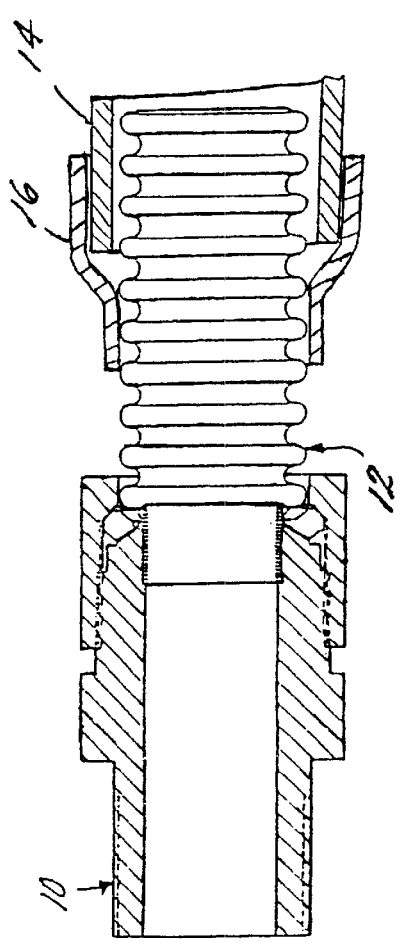
FIG. 1 is a partial cross-sectional view of an underground piping system and fitting in an exemplary embodiment of the invention.

FIG. 1 is a side view, in partial cross-section, of an underground piping system and fitting in an exemplary embodiment of the invention. The underground piping system includes flexible piping 12 (such as CSST), a protective conduit 14 and a sealing member 16. Flexible piping 12 may include a jacket (not shown). A conventional fitting 10 maybe connected to the flexible piping 12. The protective conduit 14 is a made from a semi-rigid material in order to protect the flexible piping 12 while still allowing the protective conduit 14 to be coiled for easy handling and transportation. In an exemplary embodiment, protective conduit 14 is made from polyethylene. Sealing member 16 seals the gap between the inner diameter of the protective conduit 14 and the outside surface of the flexible piping 12. This contains gas within the gas-impermeable protective conduit 14. In an exemplary embodiment, the sealing member 16 is a heat shrink polyolefin. A heat source, such as a heat gun, is used to shrink the sealing member 16 to the protective conduit 14 and the flexible piping 12 or the jacket of the flexible piping 12 if so equipped.

Figure 2:
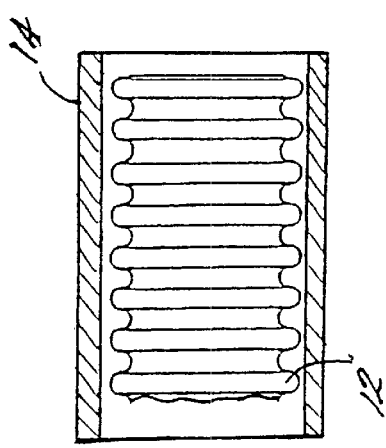
FIGS. 2–4 illustrate steps in installing the underground piping system.
Figure 3:
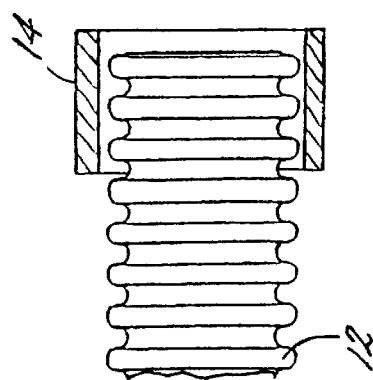

Installation of the underground piping system will now be described with reference to FIGS. 2–4. The underground piping system of the invention may be supplied in a kit containing a predetermined length (e.g. 100 feet or longer) of flexible piping 12 positioned within a similar length of protective conduit 14 and two sealing members 16. FIG. 2 depicts the flexible piping 12 positioned within the protective conduit 14. In an exemplary embodiment, the protective conduit has a cylindrical cross section. As noted above, the flexible piping 12 is positioned within the protective conduit 14 to eliminate the need to pull the flexible piping 12 through the protective conduit 14. The first step of the installation procedure is to remove a portion of the protective conduit 14. This is done using a standard tubing cutter and results in flexible piping 12 extending beyond the protective conduit 14 as shown in FIG. 3. At this point, the flexible piping 12 may be cut to a desired length.

Figure 4:
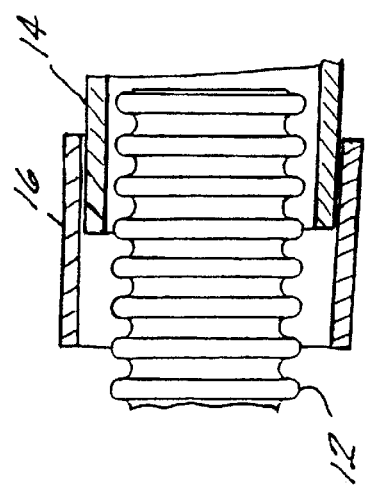

The next step is to place sealing member 16 over the end of the protective conduit 14 such that the sealing member 16 covers both the protective conduit 14 and the flexible piping 12 as shown in FIG. 4. In an exemplary embodiment, sealing member 16 has a cylindrical cross section and has an inner diameter slighter larger than the outer diameter of protective conduit 14. In an exemplary embodiment, a three inch length of sealing member 16 is used. The sealing member 16 is then heated with an appropriate heat source (e.g. heat gun) such that the sealing member contracts and seals against both the flexible piping 12 (or piping jacket) and the protective conduit 14 as shown in FIG. 1. The other end of the flexible piping 12 and protective conduit 14 may be prepared in a similar fashion. A fitting, such as fitting 10 in FIG. 1, may then be attached to the flexible piping 12 as is known in the art. If necessary, the flexible piping 12 can be removed from the protective conduit 14 after installation by removing sealing members 16 and pulling the flexible piping 12 from the protective conduit 14.

FIG. 5 shows an alternate embodiment of the invention which uses a corrugated protective conduit 15. Also shown in FIG. 5 is the jacket 13 of the flexible piping 12 described above. The corrugated protective conduit 15 may be made from polyethylene. The jacket 13 may also be made from polyethylene. The corrugated protective conduit 15 provides more flexibility than the cylindrical protective conduit 14 described above with reference to FIGS. 1–4.

FIG. 6 shows another alternative embodiment of the invention. As shown in FIG. 6, the underground piping system includes a vent member shown generally at 20. Certain regulations may require that the protective conduit 14 be vented. The vent member 20 provides for compliance with such regulations. As shown in FIG. 6, the vent member 20 is implemented, in one embodiment of the invention, using a tee joint 22. A first end 24 of the tee joint 22 is connected to the protective conduit 14 using known techniques such as adhesives. A vent opening 28 in vent tee 22 allows gas to escape from the protective conduit 14. The second end 26 of the vent tee 22 may be sealed directly to the flexible tubing 12' using a sealing member 16' contacting jacket 13'. Alternatively, the system may include an extension protective conduit 30 which is connected to the second end 26 of the vent tee 22 using known techniques. The extension protective conduit 30 is then sealed to the jacket 13 of flexible piping 12 by a sealing member 16.

The present invention provides an underground piping system which facilitates installation. The invention may be embodied in a kit including a protective conduit having flexible piping positioned therein, sealing members and vent tees if necessary. Although, the invention has been described with respect to underground installations, it is understood that it is applicable to installations in concrete slabs and similar installations were protection of the flexible piping is needed.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A kit for installing an underground gas piping system, the kit comprising:
   a length of flexible/piping positioned within a gas-impermeable protective conduit; and,
   a plurality of sealing members for sealing the protective conduit to the flexible piping.
2. The kit of claim 1 wherein:
   said flexible piping is corrugated stainless steel tubing.
3. The kit of claim 1 wherein:
   said sealing members are heat shrinkable members.
4. The kit of claim 1 wherein:
   said protective conduit is made from polyethylene.
5. The kit of claim 1 further comprising:
   a vent member for venting the protective conduit.
6. The kit of claim 1 wherein:
   said vent member is a tee joint.
7. A method of installing an underground gas piping system, the method comprising:
   obtaining a flexible piping positioned with a gas-impermeable protective conduit;
   cutting the protective conduit to expose the flexible piping; and
   sealing the gas-impermeable protective conduit to the flexible piping using a sealing member.
8. The method of claim 7 wherein:
   the sealing member is attached to the flexible piping.
9. The method of claim 7 wherein:
   the sealing member is attached to a jacket of the flexible piping.
10. The method of claim 7 further comprising:
    installing a vent member to the protective conduit.
11. The method of claim 10 wherein:
    said vent member is a tee joint.
12. The method of claim 10 wherein:
    sealing the protective conduit to the flexible piping comprises sealing the vent member to the flexible piping.
13. The method of claim 10 further comprising:
    installing an extension protective conduit to said vent member.
14. The method of claim 13 wherein:
    sealing the protective conduit to the flexible piping comprises sealing the extension protective conduit to the flexible piping.

* * * * *

UNITED STATES PATENT AND TRADEMARK OFFICE
CERTIFICATE OF CORRECTION

PATENT NO.     : 6,532,993 B2
DATED          : March 18, 2003
INVENTOR(S)    : Mark Albino It is certified that error appears in the above-identified patent and that said Letters Patent is hereby corrected as shown below:

Column 3,
Line 15, delete "were" and insert therefor -- where --
Line 26, delete "flexible/piping" and insert therefor -- flexible piping --

Signed and Sealed this

Twenty-second Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,532,993 B2
DATED : March 18, 2003
INVENTOR(S) : Mark Albino

It is certified that error appears in the above-identified patent and that said Letters Patent is hereby corrected as shown below:

<u>Column 3,</u>
Line 15, delete "were" and insert therefor -- where --
Line 26, delete "flexible/piping" and insert therefor -- flexible piping --

Signed and Sealed this

Third Day of August, 2004

JON W. DUDAS
*Acting Director of the United States Patent and Trademark Office*